United States Patent

Hoard et al.

[15] 3,691,558
[45] Sept. 12, 1972

[54] MOVING OBJECT MICROWAVE DETECTION SYSTEM

[72] Inventors: Norman F. Hoard, Milton, Mass.; Lee Edick, Manasquan, N.J.

[73] Assignee: Entron, Inc., Glendale, N.Y.

[22] Filed: June 25, 1970

[21] Appl. No.: 49,602

[52] U.S. Cl. ............343/7.7, 340/258 A, 340/258 B, 343/5 PD
[51] Int. Cl. .................................................G01s 9/42
[58] Field of Search .....340/258 A, 258 B; 343/5 PD, 343/7.7

[56] References Cited

UNITED STATES PATENTS

| | | |
|---|---|---|
| 3,512,155 | 5/1970 | Bloice............................343/8 |
| 3,242,486 | 3/1966 | Corbell.....................343/5 PD |
| 3,440,650 | 4/1969 | Kimball....................343/5 PD |

FOREIGN PATENTS OR APPLICATIONS

| | | |
|---|---|---|
| 954,536 | 4/1964 | Great Britain.........340/258 A |

Primary Examiner—Malcolm F. Hubler
Attorney—Michael Ebert

[57] ABSTRACT

A moving object microwave detection system for sensing the presence of objects moving within a radiation zone and for sounding an alarm in the event the disturbing factor is a human intruder. The system includes one or more field transceivers placed at suitable points in the areas to be protected, each transceiver including a microwave oscillator and an antenna coupled thereto to radiate continuous wave energy covering a limited zone. Coupled to the antenna is a mixing detector which provides a low-frequency beat signal in response to energy reflected back to the antenna and resulting from the presence of a moving object in the zone. The signal from the detector is fed to an amplifier having a narrow frequency band-pass characteristic which limits the response thereof to bear signals indicative of the movement of human intruders. The output of the transceiver is fed to a monitoring station which is adapted to activate a low-intensity alarm for short-term disturbances, a high-intensity alarm being sounded only when the disturbance persists.

8 Claims, 3 Drawing Figures

MOVING OBJECT MICROWAVE DETECTION SYSTEM

BACKGROUND OF INVENTION

This invention relates generally to moving object microwave detection systems, and more particularly to a system based on the doppler effect to sense the presence of an intruder and to sound an alarm.

A radar detects the presence of objects and locates their position by transmitting electromagnetic energy and observing the returned echo. In pulse radar, a relatively short burst of energy is transmitted, after which the receiver is turned on to intercept the echo. A radar transmitter may be operated continuously rather than pulsed if the strong transmitted signal can be separated from the relatively weak echo. A feasible technique for separating the received signal from the transmitted signal, where there is relative motion between the radar system and the target, is based on the doppler effect. It is well known in the fields of optics and acoustics that if either the source of oscillation or the observer of the oscillation is in motion, an apparent shift in frequency will be encountered.

The doppler effect techniques have heretofore been used in moving object microwave detection systems designed to safeguard property against burglary and vandalism. Thus, in the prior patent to Chapin U.S. Pat. No. Re. 25,100, there is disclosed a personnel intrusion device wherein microwave energy is continuously radiated throughout an area to be secured, the energy returned by a moving intruder being detected to produce an indication of his presence. Reflections obtained from fixed objects do not give rise to a change in phase or an apparent change in frequency, and therefore have no effect on the system. Thus the system is capable of discriminating between moving and stationary objects.

While existing moving object detection systems are based on workable principles, they have many practical drawbacks which militate against their adoption. For example, existing systems operate in a frequency range which is subject to interference by signals produced by aircraft landing systems or by harmonics of police radio communication networks. Also, while existing systems are intended to sense the presence of burglars, prowlers or other personnel whose appearance in a protected room or zone is unauthorized, the system is sensitive to all moving objects and may even be activated by rotating fans or other types of moving machinery. Moreover, since the output of the mixing detector of the system is a low-frequency beat signal whose rate is a function of the speed of movement of the reflecting object, the system may also react to low-frequency (60 cycle) hum signals and thereby give spurious indications.

Another serious disadvantage of existing systems is that short-term disturbances such as those produced by a large dog walking in and out of the protected zone will set off the system, for the system cannot discern the difference between such short-term disturbances and more prolonged activity of a prowler or other intruder.

SUMMARY OF INVENTION

In view of the foregoing, it is the main object of the invention to provide a moving object microwave detection system for sensing the presence of moving objects within a radiation zone and for sounding an alarm only when the moving object is a human intruder.

More particularly, it is an object of the invention to provide an electronic motion detection system adapted to safeguard property against burglary and vandalism, the zone protected by the system being enveloped with a field of very low-intensity microwave energy whereby motion within the zone activates a two-stage alarm system.

A significant feature of the invention is that when motion is detected within the protective zone during a first phase of a time cycle, a first or minor alarm is activated to generate a low-intensity sound which will persist for a few seconds and then cease. The purpose of the minor alarm is only to prepare the guard for the possibility of an alert. The zone is again monitored and if no motion is detected during the next phase which, in practice, may run 40 to 55 seconds, the system returns to its initial state. If motion is detected during this phase, a second or major alarm of much higher intensity will be activated for the remainder of the cycle. The major alarm will then be deactivated and the system restored to its original primed condition. In the next cycle, the minor alarm will again be activated by sensed motion, and if motion persists, the major alarm will again sound. This cyclical minor and major alarm sequence will continue for as long as motion is detected in the protected zone. When such motion ceases, the alarms are deactivated and the system is primed to detect future movement.

A unique advantage of the two-stage alarm arrangement is that short-term disturbances, such as that created by someone moving in and out of the zone, or in industrial installations by the momentary fall of an object, will not activate the major alarm but only the minor alarm which serves to call attention to the possibility of a violation without, however, bringing into play an emergency state caused by sounding of the major alarm. No operator is, therefore, required to turn off the alarm or reinstate the function of the motion detector, for the alarm resets itself automatically.

It is a further object of this invention to provide a system of the above-described type which is primarily responsive to movement arising from human intruders within the protected zone, so that the system will sound an alarm if the intruder is crawling, walking or running, but will not be aroused by other moving objects whose doppler frequency responses are outside the effective response range of the system.

Thus the system minimizes the sounding of false alarms. It must be borne in mind that any object detection system which is prone to sound false alarms tends to pre-condition operating personnel to the fact that an alarm may in many instances not actually be indicative of the presence of a prowler or intruder, so that in time, there is a tendency not to react quickly to the sounding of the alarm but to reserve judgment. With the present invention, this pre-conditioning is obviated, for only rarely will there be an alarm for a cause other than a human intruder.

Yet another object of the invention is to provide a system including a unitary field transceiver which combines oscillator, mixing detector and amplifier stages in a shielded case, and which reduces the length of interconnections between these stages, to minimize the sensitivity of the transceiver to extraneous noise signals. This is a salient aspect of the present invention, for where extended leads exist in the RF circuits, these tend to pick up noise signals, such as RF transients produced by electrical switching actions.

It is also an object of the invention to provide an enlarged area protection system constituted by a plurality of field transceivers operating at different frequencies and at different locations to afford multiple zone protection, the transceivers being coupled by an AND-OR device to a monitor whereby an alarm is sounded if a moving object is detected by any one or two or more of the transceivers.

Briefly stated, these objects are attained in a moving object microwave detection system in which one or more field transceivers are coupled to a monitor station, each transceiver being constituted by an oscillator generating continuous microwave energy which is radiated by an antenna, reflected energy intercepted by the antenna being demodulated by a mixing detector to produce a beat signal whose frequency is a function of the speed of movement of the reflecting object. The beat signal is amplified by an amplifier having a narrow band-pass characteristic whereby the amplifier effectively enhances only those extremely low-frequency signals representing the movement of human intruders. The intruder signal output of the transceiver which is applied to the monitoring station triggers off a minor alarm when the intruder signal is of short duration and sets off a major alarm if the intruder signal persists.

OUTLINE OF DRAWING

For a better understanding of the invention as well as further objects and features thereof, reference is made to the following detailed description to be read in conjunction with the accompanying drawing, wherein:

FIG. 3 is the schematic circuit diagram of the monitoring station.

DESCRIPTION OF INVENTION

Figure 1:
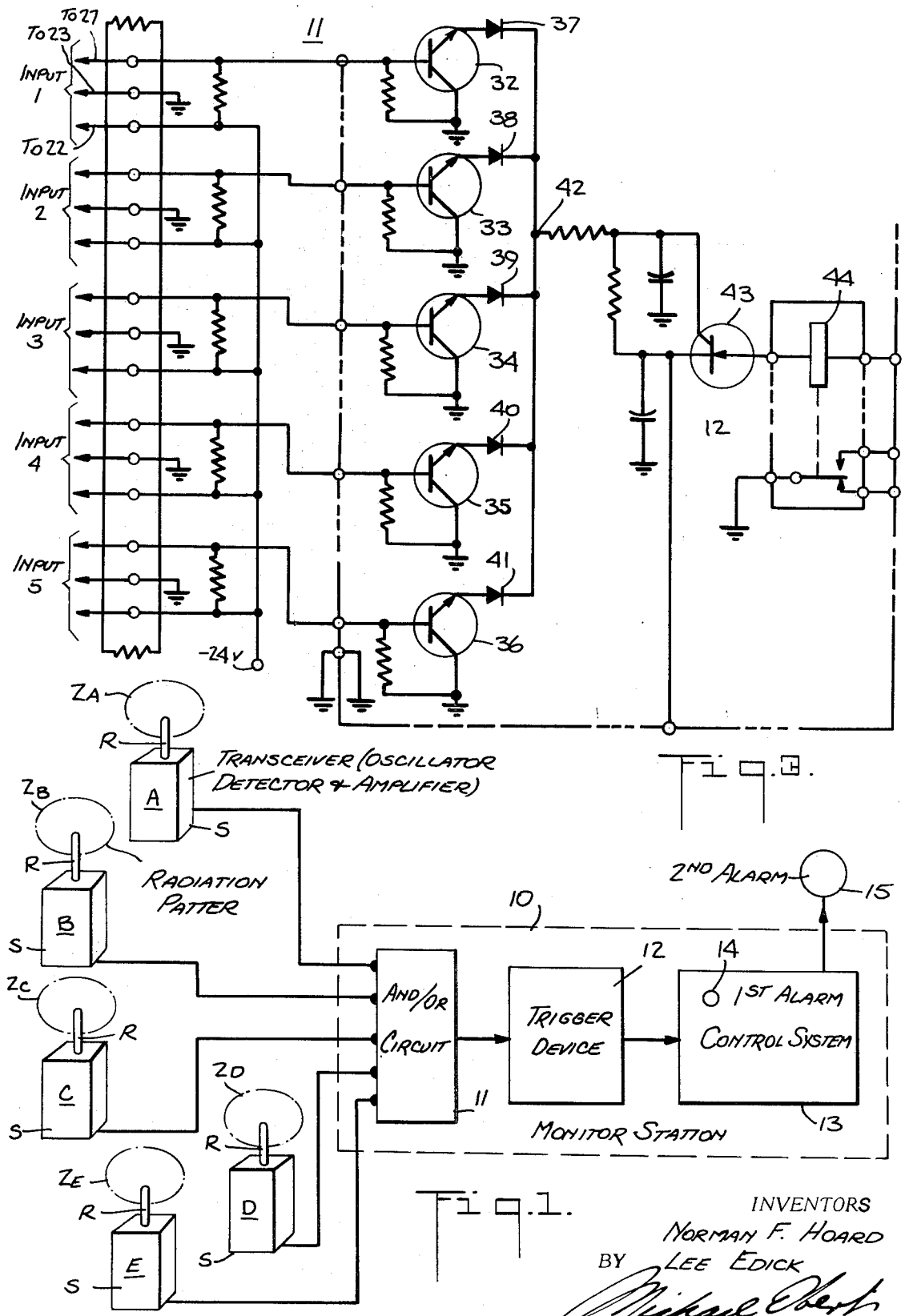
FIG. 1 illustrates a motion-detection system in accordance with the invention in which a plurality of field receivers are linked to a common monitoring station.

Referring now to Fig. 1, there is shown a system in accordance with the invention, the system comprising five field transceivers, generally designated by letters A, B, C, D and E, which are installed at various locations to obtain extensive protective coverage, all of the transceivers being linked to a common monitoring station, generally designated by numeral 10.

Each of the transceivers includes a short radiating antenna R, which is preferably untuned to propagate microwave energy within a limited zone ($Z_A$, $Z_B$, $Z_C$, $Z_D$ and $Z_E$) surrounding the antenna. Each transceiver includes a self-excited, low-power oscillator operating with an output of about 100 milliwatts and preferably in a frequency range of 900 to 930 megacycles. Theoretically, the protective field of RF energy surrounding the antenna is shaped like a doughnut, with the antenna upright in the center, the omnidirectional field extending outwardly some 25 feet, with a cross-sectional depth of about 15 feet. But this theoretical field pattern exists only when the antenna is located in free space without restricting sides and devoid of interfering objects. However, this ideal condition is never encountered in reality so that the actual radiation pattern is distorted by reflecting or absorbing stationary objects.

Increasing the number of transceivers enlarges the area of coverage. While FIG. 1 shows five such transceivers at different locations of interest, a greater or smaller number may be used. For example, if the system is intended to protect a bank after hours, a single transceiver in the vault area may be sufficient, with the monitor in the guard room. But when the system is installed in a factory or office building, there may be as many as seven critical areas requiring supervision, and in that case the monitor will be located at some central station. It will be appreciated that the invention is useful in any environment, whether domestic, commercial, industrial or military, requiring protection against unauthorized intrusion.

Since the frequency range of 900 to 930 MC is one which is well removed from other assigned ranges in the radio spectrum, it is preferred. Where several transceivers are employed, their operating frequencies are set with at least a 5-megacycle displacement therebetween to prevent interference, particularly as a result of drift which may cause the frequency of a transceiver to move toward that of another. Another reason for preferring a high frequency for the transceiver signal (in the order of 900 megacycles) is that the penetrating power of this signal is poor as compared to a signal of the same strength but of lower frequency, such as one at 400 megacycles. The poor penetration of the signal is advantageous, for when the transceiver is installed in an enclosed area or room which is to be protected against intruders, the 900-megacycle signal will not, to any great degree, pass through the walls of the enclosure and hence the system will be insensitive to actions in areas beyond the room or the selected area to be monitored.

Each transceiver, in addition to a microwave oscillator, includes a mixing detector which is coupled to the antenna and produces a beat signal whose frequency depends on the phase shift or apparent frequency difference between the transmitted signal and the reflected signal resulting from moving objects. This beat signal, in the case of human intruders, lies in the extremely low frequency range of ½ to 10 cycles, the low end of the range representing a crawling or creeping intruder and the upper end a fast-running intruder.

An intruder walking at an average rate will produce a beat signal of about 2 or 3 cycles. On the other hand, high-speed machinery will produce beat signals at a much higher rate. In order, therefore, to restrict the response of the system to human intruders and to discriminate against movements producing beats at a higher rate, the amplifier of the receiver is designed with a narrow band-pass characteristic which acts to attenuate signals below and above the ½ to 10 cycle range, the band-pass curve being peaked at about 2 to 3 cycles to emphasize the response of the system to intruders walking at an average rate.

Transceivers A, B, C, D and E are linked by cables to respective input terminals of an AND-OR circuit 11 in monitoring station 10, whose common output is connected to an electronic trigger device 12. The arrangement is such that when a single transceiver or any two or more of the transceivers senses the presence of movement which produces a beat signal within the response curve of the transceiver amplifier, thereby indicating the presence of a human intruder, AND-OR circuit 11 will activate the trigger device which will remain operative until de-activated. This trigger function may be carried out by a thyratron tube or an equivalent SCR device which, when fired, remains operative until cut off or extinguished.

Trigger device 12, in turn, initiates the operation of a two-stage control system 13 which is adapted to selectively operate a low-intensity internal alarm 14, hereafter referred to as the minor alarm, and a high-intensity external alarm or siren 15 creating a state of emergency. The external alarm is hereafter referred to as the major alarm.

In practice, the control system may include a motor-operated cam switching device, the motor being set into motion by activation of the trigger device 12 and having a 1-minute cycle, at the end of which the system is returned to its initial or primed state. When motion in the protective zone or zones is detected and the trigger device is activated, the minor alarm 14 is actuated to produce a low-intensity warning sound. This warning sound will continue for the first phase of the motor cycle, say for 5 to 20 seconds, depending on the setting of the system, after which the trigger device is de-activated and the minor alarm turned off. But the motor is still running and if motion is sensed during the second phase of the cycle (say, 55 seconds), the trigger is again fired and the switching action produced by the motor during the second phase coupled with a relay action produced by the fired trigger sets off the major alarm 15 to create an emergency alert. At the end of the cycle, the system returns to its initial state.

In some instances, an audible minor alarm for the first phase of the cycle may be objectionable, for its sound may tip off an intruder. It may therefore be desirable to substitute a visual display for the minor alarm, such as a light indicator or other means which can be observed only at the monitoring station. Or the minor alarm may be arranged to take the form of floodlights which are activated to illuminate the area covered by the system.

In other instances it may be desirable to render the first or minor phase totally silent and to have it serve merely as an alert interval during which no indication or alarm is produced, unless this phase is followed by the presence of an intruder during the second phase.

If motion is again detected, a new cycle will be initiated and the minor alarm set off, followed by operation of the major alarm. This cyclical minor and major alarm sequence will continue so long as motion persists in the protective envelope.

Figure 2:
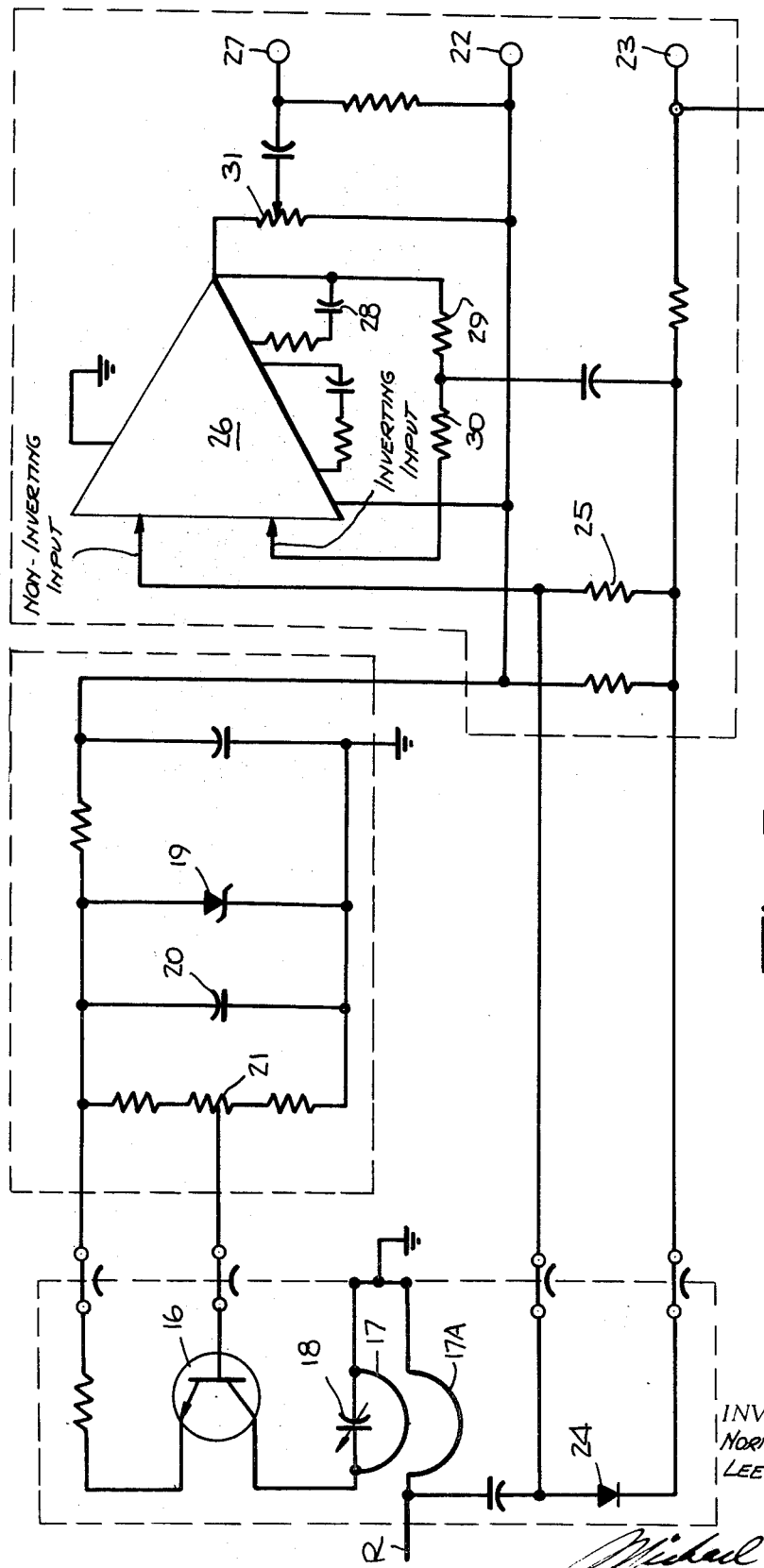
FIG. 2 is the schematic circuit diagram of the transceiver.

Referring now to Fig. 2, there is shown the circuit of a field transceiver (A, B, C, D or E) which is constituted by a microwave oscillator, a mixing detector and a tuned amplifier in a unitary assembly. The oscillator includes a transistor 16 coupled to a resonator formed by a half-turn coil 17 in parallel with a variable condenser 18, the oscillator being of the grounded-collector type and preferably operating in a range of 900 to 930 MC. Thus by adjusting capacitor 18, one may tune the transceiver to any assigned frequency within the range.

Direct voltage for the oscillator transistor 16 is supplied by a voltage regulator including zener diode 19, filter capacitor 20 and voltage divider 21. A rectified, unregulated voltage is applied to the input of the regulator by way of terminals 22 and 23, terminal 23 being grounded. Thus lines extending from the monitoring station supply voltage to terminals 22 and 23 to power the transceivers. The stabilized voltage applied to the oscillator minimizes frequency drift.

Oscillator coil 17 is inductively coupled to a similar coil 17A of the mixing detector which includes a diode 24, coil 17A being connected to the antenna R. The beat signal yielded by the detector is developed across a resistor 25 and is applied to the non-inverting input terminal of an operational, solid-state differential amplifier 26 whose output is fed to terminal 27.

The operational amplifier is provided with a negative feedback circuit including capacitor 28 and resistors 29 and 30, the feedback voltage being fed into the inverting input of the amplifier. The parameters of the feedback network and of other resistor-capacitor elements coupled to the amplifier are such as to impart thereto a narrow band response effectively restricted to the ½ to 10 cycle range. The sensitivity of the system is controlled by a potentiometer 31 in the output circuit of the amplifier. Thus the amplifier enhances only beat signals indicative of a moving human intruder.

All of the transceiver stages (oscillator, mixing detector and amplifier) are housed within a shielded casing (S in Fig. 1) to provide a unitary assembly. Since the detector has a high impedance output, lines going from the detector to the amplifier input would tend to pick up extraneous high-frequency signals, should these lines be long, as would be the case where the amplifier is remote from the detector. Thus, had the amplifier been placed in the monitor, such pick-up would occur unless careful shielding were used. However, because of the unitary transceiver design, these lines are short and the entire assembly is inexpensively shielded, thus minimizing the pick-up of undesirable noise signals.

The only signal line going from the transceiver to the monitoring station is the very low-frequency, low-impedance output line from terminal 27 of the amplifier. Thus the three lines from terminals 27, 22 and 23 of the transceiver carry low-voltage direct current and a very low-frequency amplified beat signal, and RF shielding thereof is unnecessary.

Referring now to FIG. 3, the various monitoring station stages, other than the control system, are shown. AND-OR circuit 11 is constituted by five input terminals 1 to 5, each having a set of three contacts which are connected by lines of appropriate length to terminals 27, 22 and 23, respectively, on the associated transceiver. The amplified beat signal from terminal 27 is fed by inputs 1 to 5 on the terminal strip of the AND-OR circuit to the base of transistors, 32, 33, 34, 35 and 36, whose emitters are connected through isolation diodes 37, 38, 39, 40 and 41 to a common output terminal 42.

The application of a beat signal to any transistor in the AND-OR circuit will render it conductive, as a consequence of which the signal will be fed to the firing electrode of SCR device 43 of the trigger circuit 12 and cause the trigger to fire. This will occur should a single transistor (32 to 36) be rendered conductive or any combination thereof, so that the detection of an intruder by one or more field transceivers will activate the trigger.

In some instances it may be desirable to know not only that an intruder is present in one of the protective zones, but also to identify the zone, so that steps can be quickly taken to locate and intercept the intruder. Where, for example, the transceivers are located on different floors of a building, it is desirable to know which floor has been violated. This can be done by connecting panel light indicators to the circuits of transistors 37 to 41.

When SCR device 43 is fired, it effects energization of a relay 44 which, in turn, initiates the operating cycle of the two-stage alarm system in the manner previously described so that first the minor alarm is actuated and goes off after the first phase of the cycle is completed, and if intruder motion is detected during the next phase of the cycle, whose duration is determined by a timing motor, the major alarm is sounded. The specific details of the two-stage control system are not spelled out in that it will be obvious to one skilled in the art how the desired functions may be carried out electronically, electromechanically or electromagnetically.

While there has been shown a preferred embodiment of a moving object microwave detection system according to the present invention, it will be understood that modifications may be made without departure from the essential spirit of the invention.

What we claim is:

1. A moving object microwave detection system comprising:
   A. at least one unitary field transceiver constituted by a microwave oscillator stage to produce microwave energy which is propagated within a protective zone, a mixing detector stage responsive to said microwave energy and energy reflecting from a moving object in the zone to produce a beat signal which is a function of the rate of movement, and an amplifier stage coupled to said detectors and having a narrow band-pass characteristic to substantially amplify only beat signals indicative of human intruders to produce an amplified beat signal, and
   B. a monitoring station coupled to said transceiver and including means responsive to said amplified beat signal to create an alarm, said alarm being constituted by a minor alarm of low intensity which is activated when the amplified beat signal is of short duration, and a major alarm of greater intensity which is activated when said signal persists.

2. A system as set forth in claim 1, including a plurality of said transceivers, and an AND-OR circuit at said station coupled to said transceivers to provide an output to activate said alarm in the event any one or more of said transceivers senses an intruder.

3. A system as set forth in claim 1, wherein said station includes a trigger which is coupled to said transceiver and is fired when an intruder is sensed, said trigger when fired activating said alarm.

4. A system as set forth in claim 1, wherein said band-pass has a range of about ½ to 10 cycles per second.

5. A system as set forth in claim 1, wherein said transceiver stages are housed in a shielded casing from which extends a radiator rod coupled to said oscillator and detector stages.

6. A system as set forth in claim 1, wherein said amplifier stage is constituted by an operational amplifier having a negative feedback network acting to attenuate all frequencies outside of said band-pass.

7. A system as set forth in claim 1, wherein said microwave energy is in the range of about 900 MC to 930 MC.

8. A system as set forth in claim 1, wherein said minor alarm in the form of a visual indication which is activated when the amplified beat signal is of short duration, followed by an audible major alarm which is activated when the signal persists.

* * * * *